UNITED STATES PATENT OFFICE.

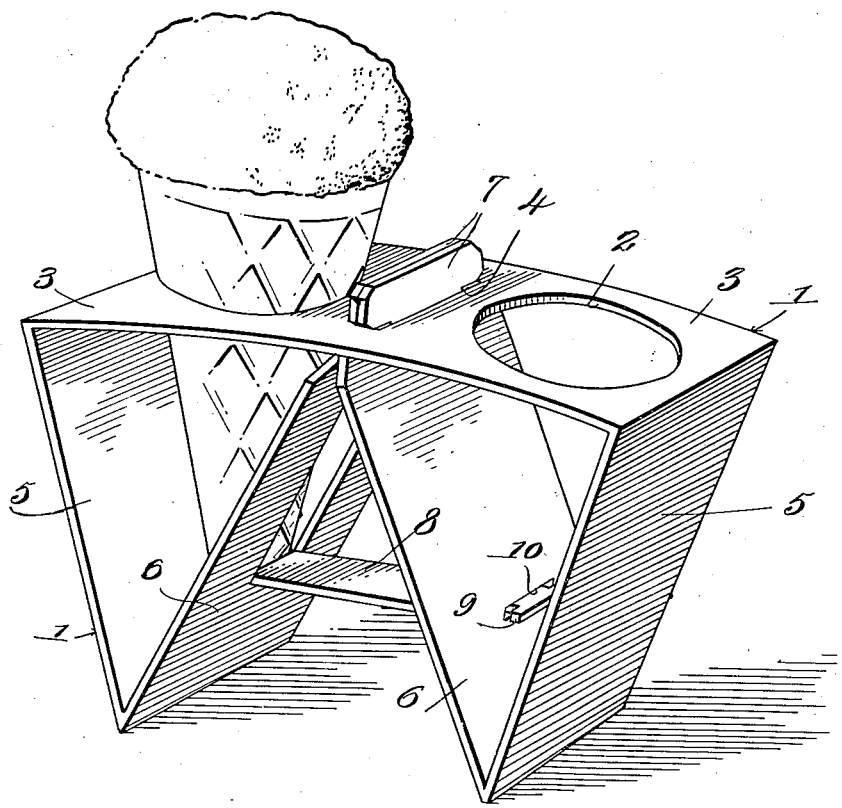

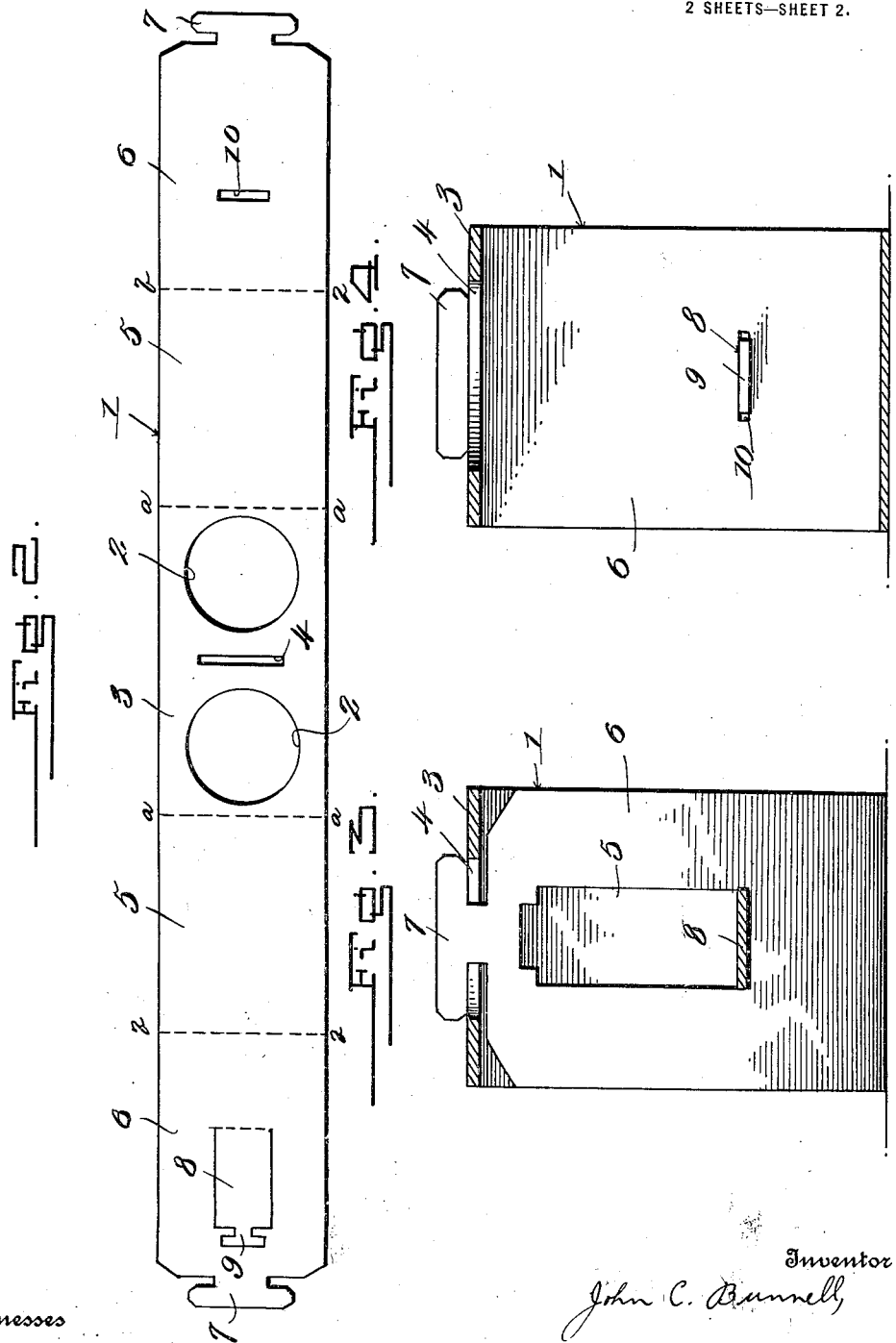

JOHN C. BUNNELL, OF BOISE, IDAHO.

CONE-HOLDER.

1,172,667.  Specification of Letters Patent.  Patented Feb. 22, 1916.

Application filed October 18, 1913. Serial No. 795,980.

*To all whom it may concern:*

Be it known that I, JOHN C. BUNNELL, citizen of the United States, residing at Boise, in the county of Ada and State of Idaho, have invented certain new and useful Improvements in Cone-Holders, of which the following is a specification.

This invention relates to an improved confection cone stand.

The object of my invention is to provide a sanitary and convenient confection cone stand, the arrangement and construction being such that a plurality of cones containing ice cream, ices or the like may be conveniently supported therein after or while being filled.

A further object of the invention contemplates the provision of a collapsible cone stand or support, wherein the several parts thereof are formed integral, so as to effect when collapsed and disarranged a single strip of bendable material.

The invention still further contemplates the provision of a device of the character described wherein the fastening means associated therewith is formed by providing a plurality of tongues and extensions, struck-out from or formed integrally with the said device, the same being arranged in such a novel and peculiar manner as to form an effective securing means whereby the several embodiments or parts of the invention are maintained in proper relation.

A still further object of the invention is to construct the stand with such regard to proportion, arrangement, and number of parts that it may be cheaply manufactured and may be readily and conveniently collapsed and assembled to facilitate when in the former position, the packing, shipping, and storing thereof.

The above and additional objects are accomplished by such means as are illustrated in their preferred embodiment in the accompanying drawings, described in the following specification and then more particularly pointed out in the claims which are appended hereto and form a part of this application.

In describing my invention in detail reference will be had to the accompanying drawings wherein like characters denote like or corresponding parts throughout the several views, and in which:—

Figure 1 is a detail perspective view of a cone stand constructed in accordance with my invention, the same illustrating the application thereof; Fig. 2 is a plan view of the single strip of bendable material of which the stand is composed; Fig. 3 is a cross sectional view taken through the center of the stand; and Fig. 4 is a cross sectional view taken through one of the stand sections.

Before proceeding with the description of the drawings I desire to call particular attention to the fact that while I have evolved my invention with particular reference to its application to ice cream cones, the same may be readily utilized as a stand or support for various other articles or devices susceptible of its application.

Referring now to the drawings wherein is illustrated the preferred embodiment of my invention the numeral 1 designates a bendable strip, preferably card board, of which the stand comprising my invention is composed. Openings 2, of which there may be any number are formed within the central section or part of the strip 1, the said section being designated by the numeral 3 and hereinafter referred to as the top of the stand. A slot 4 is formed within the top 3 of the stand, the said slot being disposed between the openings 2 thereof, the purpose of the slot to be hereinafter fully described.

The strip 1 is adapted to be bent upon the dotted lines *a—a* of Fig. 2 of the drawings, the bent portions designated 5 extending downwardly at an acute angle to the top 3 of the stand as illustrated to advantage in Fig. 1 of the drawings. The strip 1 is again bent upon the lines *b—b* of Fig. 2, the bent portions designated 6 forming, with the bent portions 5, the support means for the top 3 of the stand. Locking tongues 7 are formed integrally with and upon the extremity of the said bent portions 6, the said tongues both fitting within the slot 4 of the stand top 3 to serve as a fastening element for the support means of the stand and to maintain the said bent portions 5 and 6 in their proper assembled position. As a further securing means, one of the bent portions 6 of the stand is provided with an integral formed in-struck extension 8, the free end of which is provided with a locking tongue 9 adapted to be fitted within an opening or slot 10 provided therefor within the opposite or other bent portion 6 of the said strip 1. By the provision of the extension 8 and tongue 9, it is apparent that the support means of the stand is laterally braced, and the strips 5 and 6 comprising the said support means securely fastened in proper spaced relation to prevent an accidental collapse of the stand when in use.

It is apparent from the foregoing, that the entire stand or support is composed of a single strip of bendable material, shaped and illustrated in Fig. 2 of the drawings and assembled to effect a collapsible stand in the following manner. The portions 5 of the strip 1 are bent downwardly and inwardly upon the dotted lines a—a of Fig. 2. The said strip 1 is then again bent upon the dotted lines b—b of the said Fig. 2, the second mentioned bent portion 6, forming, with the bent portions 5 above mentioned two spaced apart substantially V-shaped support members. By fitting the tongues 7 of the portions 6 through the slot 4 provided therefor within the stand top 3, it will be seen that the said support members are maintained or locked in assembled position, a further fastening thereof being effected by the provision of the extension 8 having a locking tongue 9 formed upon one end thereof, the said tongue fitting within a slot 10 provided therefor within the opposite portion 6 of the strip 1 from that upon which the said extension 8 is struck out.

Empty cones to be filled, or cones after having been filled may be supported by the stand, the openings 2 in the top portion 3 thereof serving as a supporting element therefor, the converged end or apex of each cone fitting within the converged extremity of the substantially V-shaped supporting members provided for the said top 3.

From the above, taken in connection with the accompanying drawings it will be seen that an individual support is provided for each cone; that the stand may be collapsed by removing the tongues 7 and 9 from their respective slots 4 and 10 provided therefor; and that the stand when assembled may also be used as a carrier or tray, the extension 8 serving as a handle for that particular purpose.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claims.

Having thus fully described my invention, what I claim as new and desire to secure by Letters Patent, is:—

1. As an article of manufacture, a knockdown cone stand comprising a single strip of material having openings formed therein for the reception of the cones, supports formed by bending the said strip of material at each end, the terminals of the respective bent portion being detachably fastened to that portion of the strip having the openings formed therein, and means formed upon one of said supports adapted for detachable engagement with the other of said supports to serve as a brace for the stand.

2. A collapsible stand composed of a single strip of bendable material including a top portion having a plurality of openings formed therein through which the article to be supported extends, substantially V-shaped support members depending from the said top portion, one extremity of the said support members being detachably secured to the said top, and means carried by one of the said support members and disposed for engagement with the other of the said support members to maintain the two in spaced relation.

3. A collapsible stand composed of a single strip of bendable material including a top portion having a plurality of openings formed therein through which the article to be supported extends, the said top being further provided with a slot disposed at a point intermediate its ends, substantially V-shaped support members extending from the said top portion, locking tongues formed upon the free end of the said support members, the said tongues adapted to fit within the said slots to maintain the said support members immovable with respect thereto, an additional securing means carried by one of the said support members and disposed for engagement with the other of the support members, as and for the purpose set forth.

4. A collapsible stand composed of a single strip of bendable material including a top portion having a plurality of openings formed therein, the said openings adapted to form a support for the article acted upon by extending the said article therethrough, the said top being further provided with a slot formed therein at a point intermediate its ends, substantially V-shaped uniformly spaced apart support members depending from the said top portion, locking tongues formed, one upon the free end of each of the said support members, the said tongues adapted to both fit within the said slot above mentioned, an extension formed upon one of the said support members, a locking tongue formed upon the free end of the said extension adapted to engage the other of the said support members to maintain the two support members in uniform spaced relation, as and for the purpose set forth.

5. A collapsible stand composed of a single strip of bendable material including a top portion having a plurality of openings formed therein through which the article to be supported extends, the said top being further provided with a slot formed at a point intermediate its ends, substantially V-shaped support members formed by bending the respective ends of the said strip, locking tongues formed upon the inner free end of each of the said support members, the said tongues adapted to both fit within the slot of the top portion aforesaid, a tongue struck-out from one of the said support members, and a locking tongue formed upon the extremity of said extension adapted to fit within a slot formed within the other of the said support members to maintain the two members in uniform spaced relation, as and for the purpose set forth.

6. A collapsible confection cone stand comprising a single elongated strip of material bent at its respective terminals to form stand supports, and means forming a part of one of the said supports and adapted for detachable engagement with the other of the said supports to act as a brace for the two supports.

In testimony whereof I affix my signature in presence of two witnesses.

JOHN C. BUNNELL.

Witnesses:
R. M. GASKILL,
J. K. KURLEY.